(12) United States Patent
Livingston et al.

(10) Patent No.: US 10,997,377 B1
(45) Date of Patent: May 4, 2021

(54) LASER SCRIPTED ENCODING AND DECODING

(71) Applicant: The Aerospace Corporation, El Segundo, CA (US)

(72) Inventors: Frank Edward Livingston, Redondo Beach, CA (US); Henry Helvajian, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/869,167

(22) Filed: May 7, 2020

(51) Int. Cl.
*G06K 1/12* (2006.01)
*G06K 19/06* (2006.01)

(52) U.S. Cl.
CPC ....... *G06K 1/126* (2013.01); *G06K 19/06046* (2013.01)

(58) Field of Classification Search
CPC .......................... G06K 1/126; G06K 19/06046
USPC ........................................................ 235/494
See application file for complete search history.

(56) References Cited

U.S. PATENT DOCUMENTS

| | | | | |
|---|---|---|---|---|
| 5,565,963 A | * | 10/1996 | Tsujita | G03G 15/5037 399/48 |
| 7,629,400 B2 | * | 12/2009 | Hyman | B41M 1/30 524/106 |
| 2004/0189781 A1 | * | 9/2004 | Toizumi | G03G 15/05 347/130 |

OTHER PUBLICATIONS

U.S. Department of Commerce (DoC) Report "Defense Industrial Base Assessment: Counterfeit Electronics," Bureau of Industry and Security, Office of Technology Evaluation, Jan. 2010.
B. Martin, A. Fennell, J. Neumann, L. Gardner, K. Heinz, R. Bullock, M. Cooper, J. Mulcare, J. Sigl, S. Schatz, and J. McSween, Mitigating the Risk of Counterfeit Parts, The WSTIAC Quarterly 2012, 10, 3-8.
Government Accountability Office (GAO) Report, Defense Supplier Base: DOD Should Leverage Ongoing Initiatives in Developing Its Program to Mitigate Risk of Counterfeit Parts, GAO-1O-389, Mar. 29, 2010.
C. Lavine, D. Faigin, M. Cole, J. Myers, and D. Shands, Cyber Protection and Space System Acquisition, Crosslink, Spring 2012,13, 38-45.
M. Muller, Essentials of Inventory Management, 2nd Ed., Amacom Publishing, pp. 89-112, New York, NY, 2011.
R. Meyers, The ten commandments of bar coding, Frontline Solutions, 2000, pp. A5-22.

(Continued)

*Primary Examiner* — Toan C Ly
(74) *Attorney, Agent, or Firm* — Duane Morris LLP (57) ABSTRACT

A method of encoding information on a material substrate and a device including the modified material substrate are provided. The method includes providing a material substrate having at least one exposed surface or interior (bulk) location with an initial material state, treating the exposed surface or interior location with an energy source, wherein the energy source encodes encryption information on the exposed surface or interior location to provide a modified material substrate having an exposed surface or interior location with an intermediate material state, and then treating the exposed surface or interior location with an intermediate material state with the energy source to encode decipher information on the exposed surface or interior location to provide a remodified material substrate having an exposed surface or interior location with a final material state.

20 Claims, 6 Drawing Sheets
(6 of 6 Drawing Sheet(s) Filed in Color)

(56) References Cited

OTHER PUBLICATIONS

R.C. Palmer, The Bar Code Book—Reading, Printing and Specification of Bar Code Symbols, Helmers Publishing Inc., pp. 1-45, New Hampshire, 1995.
A. Sarac, N. Absi, and S. Dauzere-Peres, A literature review on the impact of RFID technologies on supply chain management, Int. J. Production Economics 2010, 128, 77-95.
A.N. Nambiar, RFID Technology: A Review of its Applications, Proc. World Congress on Engineer. Comp. Sci., pp. 1-7, vol. II, 2009.
G.M. Gaukler and R.W. Seifert, Applications of RFID in Supply Chains, in Trends in Supply Chain Design and Management: Technologies and Methodologies, H. Jung, F.F. Chen, and B. Jeong, Eds., Springer-Verlag London Ltd., 2007, pp. 29-48.
T. Harbert, Plant DNA vs. Counterfeit Chips, IEEE Spectrum, May 2012.
L. Greenemeier, Short Circuited: Pentagon Looks to DNA from Plants to Foil Electronic Component Counterfeiters, Scientific American, Apr. 2012.
R.P. Cowburn, Laser surface authentication: biometerics for everyone, Proc. Nanotechnology for Security and Crime Prevention 2007.
J.D.R. Buchanan, R.P. Cowburn, A.-V. Jausovec, D. Petit, P. Seem, G. Xiong, D. Atkinson, K. Fenton, D.A. Allwood, and M.T. Bryan, Forgery: 'Fingerprinting' documents and packaging, Nature 2005, 436, 475.
S.-K. Kim and SB. Lee, Highly encoded one-dimensional nanostructures for rapid sensing, J Mater. Chem. 2009, 19, 1381-1389.
S.G. Penn, SM. Norton, ID. Walton, R.G. Freeman, and G. Davis, Nanobarcodes particles as covert security tags for documents and product security, Proc. Optical Security and Counterfeit Deterrence Techniques V 2004, 5310, 337-340.
X. Kong, Q. Yu, X. Zhang, X. Du, H. Gong, and H. Jiang, Synthesis and application of surface enhanced Raman scattering (SERS) tags of Ag@SiO2 core/shell nanoparticles in protein detection, J. Mater. Chem. 2012, 22, 7767-7774.
R.S. Golightly, W.E. Doering, and M.J. Natan, Surface-Enhanced Raman Spectroscopy and Homeland Security: A Perfect Match?, ACS Nano 2009, 3, 2859-2869.
F.E. Livingston and H. Helvajian, The symbiosis of light and matter: laser-engineered materials for photofunctionality, Special Issue MRS Bulletin: Direct Write Technologies 2007, 32, 40-46.
F.E. Livingston and H. Helvajian, Photophysical processes that lead to ablation-free microfabrication in glass ceramic materials, in Three-Dimensional Laser Microfabrication: Principles and Applications, H. Misawa and S. Juodkazis, Eds., 2006, Wiley-VCH: Weinheim, Germany.
F.E. Livingston, P.M. Adams, and H. Helvajian, Examination of the laser-induced variations in the chemical etch rate of a photosensitive glass ceramic, Appl. Phys. A 2007,89, 97-107.
A. Alemi, S. Khademimia, SW. Joo, M. Dolatyari, and A. Bakhtiari, Lithium metasilicate and lithium disilicate nanomaterials: optical properties and density functional theory calculations, International Nano Lett. 2013, 3, 1-11.

\* cited by examiner

LASER SCRIPTED ENCODING AND DECODING

FIELD

The disclosure relates generally to a method of encoding and decoding information on a material substrate and a device comprising the same, and more particularly, to a method for authenticating and tracking a material substrate modified by a plurality of pulsed light beams.

BACKGROUND

Counterfeit goods and components are a threat to public safety and national security. They also impact a diverse array of technologies and markets, including, e.g., pharmaceuticals, health and medicine, aviation, military, and space systems. Counterfeit markets include, e.g., goods and components that are defective or inferior in quality (i.e., fail to meet specific requirements), and goods and components that are programmed with malicious code for the malfunction of computer systems. Defense and space systems are particularly vulnerable to counterfeiting due to their complexity and dependence on electronic components, such as semiconductors, computer chips, and microprocessors. The globalization of electronics, the advent of affordable off-the-shelf components, along with displaced Internet commerce trading and continued miniaturization of electronic components, amplify the problems associated with the authentication (verify source and identity) and tracking (confirm pedigree) of critical parts within our supply chain. Space and airborne systems also suffer from acute post-launch susceptibility, as suspect or counterfeit parts cannot be analyzed after launch or require extremely difficult and dangerous procedures for replacement.

Existing anti-counterfeiting technologies include physical tags and electronic tags. Physical tags correspond to the direct integration of encoded markers or the physical attachment of transmission and receiver devices to extract component information related to source, identity and pedigree. Common physical tags include bar codes, tamper-evident closures, radio frequency identification (RFID) units, digital watermarks, holograms, and DNA marking. Electronic tags are software-level codes and data architectures that are programmed into electronic components comprising a device or product, and often take the form of metadata and authentication chips. Metadata and metacontent are data strings and structures that represent virtual electronic attachments. Component and product information can be extracted and compared to a meta database for authentication and verification.

Bar code and radio frequency identification (RFID) technologies are ubiquitous in supply chain management; however, their capabilities are more aligned with tracking and pedigree determination and less defined for authentication and security. A bar code is an optical machine-readable representation of data, where lines of varying width and periodicity encode product information for 1D tags. Rectangles, dots, hexagons, and composite patterns are used for a 2D rendering of larger data sets. Bar codes offer simplicity in concept and manufacture, high reliability and accuracy, ease of implementation, and low cost for a broad applications base. But bar codes provide minimal provisions for securely verifying product authenticity and history, as they are visually discernible and easily duplicated, and the symbology can be translated and deciphered. The optical reading requires product manipulation for direct line-of-sight monitoring, and the small amount of encoded information is static and cannot be updated or reprogrammed.

Radio frequency identification (RFID) methods have become more popular in the supply chain management sector due to advances in microelectronics and their increased capacity for enhanced encryption. RFID is a wireless non-contact system that uses radio frequency electromagnetic radiation to transfer data from a tag (transmitter) to a receiver based on an encoded interrogation signal. RFID does not require line-of-sight scanning, and multiple tags can be read simultaneously using adaptive binary tree protocols for product singulation. RFID units are durable for long-life operation, and their data can be updated "on the fly" within the supply chain. However, RF transmissions are highly susceptible to illicit tracking, eavesdropping and skimming, and are prone to interference. Cryptographically enabled tags can help mitigate these problems; however, they have dramatically higher cost and power requirements than simpler equivalents, resulting in limited and specialized deployment.

Newer anti-counterfeiting technologies incorporate nanomaterials and nanometer-scale identification and tracking labels to develop security techniques for high-value assets. Botanical and plant DNA allow the creation of custom product markers, which can be applied to microelectronics during manufacture via inks, varnishes, and plastics. Identification can include, e.g., scanning with a handheld device. However, this approach faces several formidable challenges, including the environmental instability of DNA and sensitivity to heat and UV light, very low signal-to-noise values, minimal provisions for concealing DNA code, and the long times required for analysis.

Laser surface authentication (LSA) uses diffuse scattering of a focused laser beams to assess microscopic and nanoscopic roughness of the surface of a component. The measured surface map can then be stored and accessed later to determine product authenticity. Unlike holograms and watermarks, the natural surface roughness cannot be replicated, ensuring uniqueness of feature and high accuracy. Unfortunately, LSA techniques are not amenable to transparent and reflecting surfaces and have strong alignment tolerances and appreciable memory requirements. LSA is also vulnerable to surface contamination effects, since the application of chemicals or debris by inadvertent or malicious pathways would soundly defeat the tracking process.

Other techniques are based on nanomaterial analogues of conventional physical tags and include nano bar codes SERS (surface enhanced Raman scattering) and quantum dot tags. The size, chemical composition, and ordering of the nanoparticles can be exploited to produce miniaturized optical tags that retain unique spectroscopic signatures. However, the emission patterns are singular in form and are revealed through optical scanning at a known and discrete wavelength. Once the composition is determined, the tag is compromised and can be readily duplicated to yield the intended spectral fingerprint.

The above anti-counterfeiting techniques lack universal translation and suffer from common problems such as variable security, static information only, easy visual detection and duplication, and specialized deployment. Thus, there is a need for highly-adaptable anti-counterfeiting methods that offer both authentication and tracking and data security.

SUMMARY

In various embodiments, a method of encoding information on a material substrate is disclosed. The method comprises providing a material substrate comprising at least one exposed surface or interior (bulk) location having an initial material state; treating the exposed surface or interior location with an energy source, wherein the energy source encodes encrypted information on the exposed surface or interior location to provide a modified material substrate comprising an exposed surface or interior location with an intermediate material state; and treating the exposed surface or interior location with an intermediate material state with the energy source to encode decipher information on the exposed surface or interior location to provide a remodified material substrate comprising an exposed surface or interior location with a final material state.

In various embodiments, a device comprising a modified material substrate having at least one modified surface or interior location is provided. The at least one modified surface or interior location comprising surface or bulk chemistry that is distinguishable from an unmodified surface or interior location of the device, wherein the surface or bulk chemistry is defined by phase state, composition, density, transductions, inductions, or any combination thereof; and the surface or bulk chemistry of the at least one modified material surface or interior location was obtained by treating at least one surface or interior location of a material substrate with a plurality of pulsed light beams.

Additional features and advantages will be set forth in the detailed description which follows, and in part will be apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

The patent or patent application file contains at least one drawing in color. Copies of this patent or patent application publication with color drawings will be provided by the Office upon request and payment of the necessary fee.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

In various embodiments, a method is provided to address the deficiencies associated with existing anti-counterfeiting strategies. In some embodiments, the method is configured for authentication and tracking, anti-counterfeiting, and secure information transfer and data security using an energy source in conjunction with a specific response from a material substrate. The method is not limited to any particular material substrate; i.e., the method can be applied to any material class or device. The energy source can be any suitable source of pulsed light beams. In some embodiments, the energy source is a laser configured to generate a plurality of pulsed light beams. In some embodiments, other types of energy sources can be used, such as electron beams, x-rays, proton beams, and lamp and arc sources.

Lasers or other light sources have the unique property of delivering precise photonic energy at a distance. As a consequence, laser processing can be physically non-intrusive and conducted on a local scale. Laser processing techniques are applicable to many different types of materials, such as metals, glasses, ceramics, polymers, semiconductors, and biomaterials, with a scale resolution that can approach the wavelength of light. Laser processing techniques offer excellent precision and control. As a result, laser processes can be used to remove material with very high precision, aid in the deposition of materials, alter the phase of processed materials, or act as a spectroscopic monitor during processing.

In some embodiments, the method combines laser encoding encrypting and deciphering information with the inherent properties of a specific material substrate. In some embodiments, this optical approach relies on the ability to administer discrete laser pulse sequences to a material substrate that is integrated or embedded within a component to be labeled. In some embodiments, the process comprises encoding covert information on an exposed surface or interior location of the material substrate via a laser encryption pulse script and then translating the information using a laser deciphering pulse script.

Figure 1:
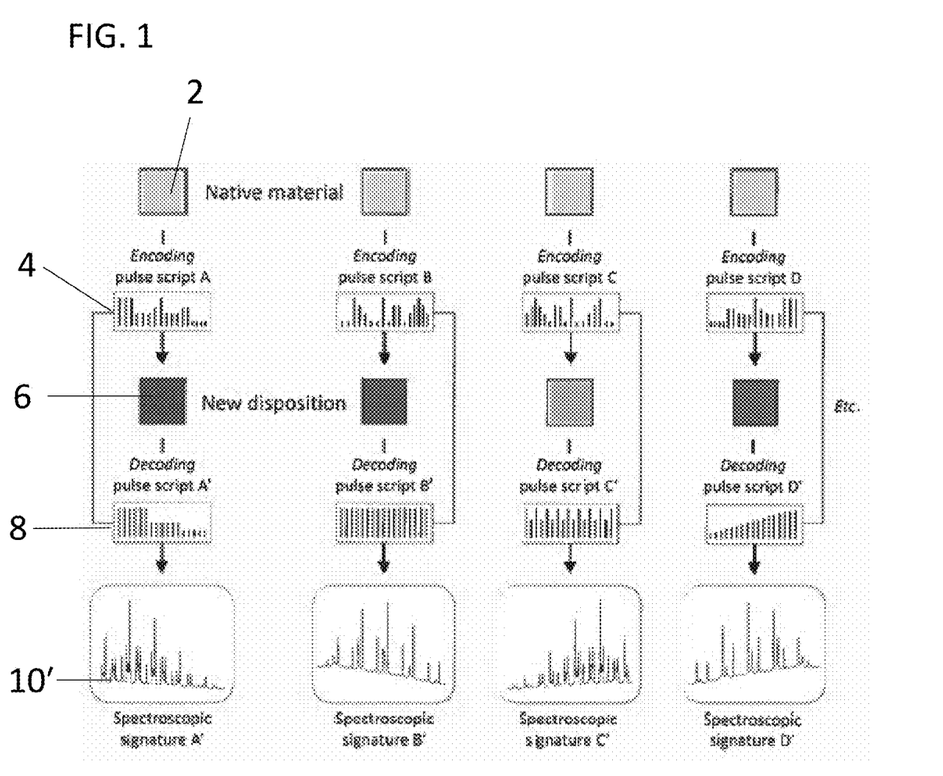
FIG. 1 is a diagram providing a simplified overview of a process of encoding information on a material substrate, in accordance with some embodiments of the present disclosure.

An overview of the laser encoding-decoding methodology is depicted in FIG. 1. In some embodiments, a native material substrate (2) is treated with a laser encryption pulse script (4) to obtain a modified encoded material substrate (6) having a distinct disposition from that of the native material substrate (2). The modified material substrate (6) is then treated with a laser decryption pulse script (8) to obtain a remodified material substrate (10) (not shown) having a distinct spectroscopic signature (10').

In some embodiments, the laser pulse scripts are derived from the underlying chemical physics, solid-state dynamics, and photochemistry associated with the laser-material interactions. In some embodiments, the laser pulse scripts are spatially- and temporally-synchronized, and administered to prepare pre-determined phases, compositions, dispositions, and inductions in materials for eliciting a particular spectral emission.

In various embodiments, the methods of the present disclosure utilize laser pulse scripts to encode encryption and deciphering information into a material substrate. Systems for generating laser pulse scripts are described in U.S. Pat. No. 7,526,357, entitled PULSE MODULATION LASER WRITING SYSTEM, issued on Apr. 28, 2009; U.S. Pat. No. 8,679,189, entitled BONE GROWTH ENHANCING IMPLANT, issued on Mar. 25, 2014; U.S. Pat. No. 10,228,666, entitled MATERIAL MODIFICATION ASSEMBLY AND METHOD FOR USE IN THE MODIFICATION OF MATERIAL SUBSTRATES, issued on Mar. 12, 2019; and co-pending U.S. patent application Ser. No. 15/469,132, entitled SYSTEMS AND METHODS FOR MODIFYING MATERIAL SUBSTRATES, filed Mar. 24, 2017; the contents of which are incorporated herein by reference in their entireties.

In some embodiments, the laser encryption pulse script (4) is used to program the integrated or embedded material (2) into distinct dispositions based on the predetermined and underlying fundamental physics and chemistry of the native material substrate (2). In some embodiments, the dispositions comprise variable phase states, compositions, density, transductions, inductions, or combinations thereof; and can manifest as singular encoded inclusions or complex combinations and permutations of disposition types. In some embodiments, a laser deciphering pulse script (8) is used to extract the covert information, eliciting a pre-determined and pre-programmed response from the encoded material substrate (6). In such embodiments, the response depends exclusively on the encoded disposition and the specific laser deciphering pulse script, and thus represents a highly exclusive spectroscopic fingerprint or signature (10') that can be converted for secure information retrieval.

In some embodiments, information encoding and data encryption are accomplished by the administration of a unique and covert laser encryption pulse script to an integrated or embedded material substrate. In such embodiments, the laser encryption pulse script (4) is used to program distinct dispositions into the integrated material based on the pre-determined and underlying fundamental material physics and chemistry. The dispositions can comprise variable phase states, compositions, density, transductions, inductions, or combinations thereof, and can manifest as singular encoded inclusions or complex combinations and permutations of disposition types. In some embodiments, the final state of the host material can be controlled by thermal and non-thermal channels and realized through chemical pathways (e.g. reactions, composition changes, quantum well intermixing) or physical pathways (e.g. phase or structural changes, mechanical alterations), which are all achieved through the precise delivery of a prescribed laser encoding pulse script.

In some embodiments, information retrieval, data transfer, and authentication are accomplished by the administration of a unique laser deciphering pulse script (8), which is exclusively and reciprocally linked to the laser encryption pulse script (4). The secret decoding script is configured to elicit a pre-determined and pre-programmed response from the encoded material substrate. The response represents a very distinct photoemission pattern or spectroscopic signature, which can originate from direct stimulation of the particles or constituents comprising the material or from indirect excitation via coupling with the host matrix. In such embodiments, the measured spectral fingerprint (10') can be compared to an expected (e.g., known or modeled) photoemission pattern to accurately and definitively determine component authenticity, and can be analyzed for secure information retrieval. In some embodiments, the deciphering pulse script (8) can be specially designed to induce additional transformations in the material (6), rendering it to a secondary (or tertiary, quaternary, etc.) phase or state with its own distinct spectroscopic signature (10'). In such embodiments, the material substrate can, therefore, operate as a dynamic smart tag, where the laser decoding pulse script and exposure history of the material can be exploited to enhance multifactor authentication, security, and data payload capacity.

In some embodiments, the encoded information on the material substrate can be exclusive (supplemental) or inclusive (direct) of the component or device. For example, micro- and nanoscale tags can be in the form of an inconspicuous adjunct material that is affixed to the primary device or packaging structure. In some embodiments, quantum dots, glass ceramics, and other nanoparticles present attractive material options, having high photo-conversion efficiency and sensitivity, sufficient compositional complexity, and stealthy character. The quantum dots and nanoparticles can be deposited directly onto a component or product, as neat constituents or embedded in a host matrix such as an organic polymer or glass ceramic. In some embodiments, information can be encoded via direct signature into the form and structure of the component or device, such as the external housing, component body, or an integrated subsystem. In some embodiments, the encoding can be crafted and spatially localized, mitigating any effects to the overall performance or function of the device. The encoding methods, whether direct or supplemental, are covert and unobtrusive, and offer resilient data encryption and data transfer.

In various embodiments, the combination of the pulse-scripted optically-encoded instructions and data retrieval along with the properties of the specific material substrate address the critical limitations associated with existing authentication and tracking methods, and further offers many significant benefits and improvements, including: multi-factor authentication via encryption and deciphering pulse scripts (6, 8); the write-read authentication pulse scripts are exclusively and reciprocally linked; sequential encoding-decoding of multiple encryption and deciphering pulse scripts; the pulse scripts can be altered on command for enhanced security; the combination of pulse scripts provides high resistance to ID replication and reverse engineering; the method and system are applicable to all component and packaging levels; material-light resonance for high excitation and emission efficiency; the method and system have minimal energy requirements for optical response and operation; the method and system are easily integrated into conventional processing and manufacturing protocols; the method is applicable at a point of device production, on-site post assembly, or point of deployment; and the method and system are scalable for commercial and industrial applications with reduced cost.

EXAMPLES

Various embodiments will be further clarified by the following examples. The following examples are set forth below to illustrate the products, systems, methods, and results according to the disclosed subject matter. These examples are not intended to be inclusive of all embodiments of the subject matter disclosed herein, but rather to illustrate representative products, systems, methods, and results. These examples are not intended to exclude equivalents and variations of the present disclosure which are apparent to one skilled in the art.

The ability to encode encrypting and deciphering information in a material substrate was demonstrated through the laser-scripted processing of a glass-ceramic substrate. A photosensitive glass ceramic under the trade name Foturan was obtained from the Schott Corporation. Foturan is an alkali-aluminosilicate glass composition that includes silica and various stabilizing oxide admixtures. The photosensitive character of Foturan is derived from the inclusion of trace amounts of a photo-initiator compound and nucleating agents in the base glass that permit local spatial control of the precipitation processes. In Foturan, the photoactive component is cerium and the nucleating agent is silver. Foturan represents a model candidate material for this disclosure due to its acute photo-responsive character and phase precipitation meta stability.

Foturan substrates (2) were treated using a laser-scripted process. In some embodiments, the laser parameter specifications were defined with wavelengths ranging from about 355 nm to about 500 nm, pulse durations ranging from several hundred femtoseconds (fs) to a few nanoseconds (ns), and pulse repetition rates ranging from several kHz to one hundred MHz. The pulse scripts spanned a broad laser processing parameter domain, with variations in pulse number (1 to 300,000), pulse intensity (0.01 to 1000 $mJ/cm^2$), and inter-pulse delays (10 ns to 1 ms). In some embodiments, the laser parameter specifications were defined with wavelengths ranging from about 266 nm to about 1064 nm, pulse numbers extending to about 1,000,000; pulse intensities as low as 0.0001 $mJ/cm^2$, and inter-pulse delays ranging from about 1 ns to about 100 ms. The irradiation wavelengths and pulse parameters represent specifications that can be achieved with compact laser systems and high-power diode modules. Among other things, the processing specifications provide scalability, system prototyping, and manufacturing integration.

Figure 2A:
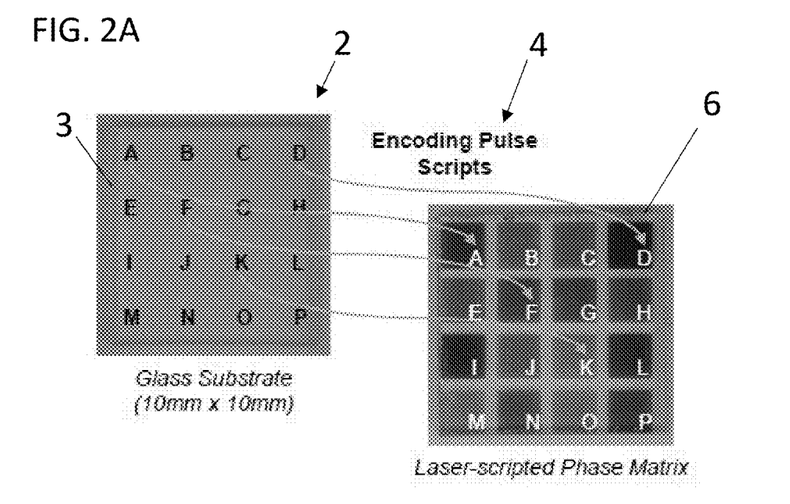
FIG. 2A displays a top view of photomicrographs of a material substrate, before and after treatment with a laser encrypting script, in accordance with some embodiments of the present disclosure.

FIG. 2A displays photomicrographs of Foturan coupons (10 mm×10 mm) that were acquired before (left image) and after (right image) processing with laser encrypting pulse scripts. In this example, the laser pattern consisted of a four-by-four array of squares (2 mm×2 mm). A discrete laser encrypting script (4) was applied to each square to obtain the modified substrate (6). The patterned array permitted the evaluation and elaboration of sixteen unique laser encrypting pulse scripts (4) per substrate (2) (labeled A thru P). The variegated colors of each square of the modified substrate (6) illustrate the myriad phases and compositions that can be encoded into the glass substrate with variable density, particle size, and optical properties.

Figure 2B:
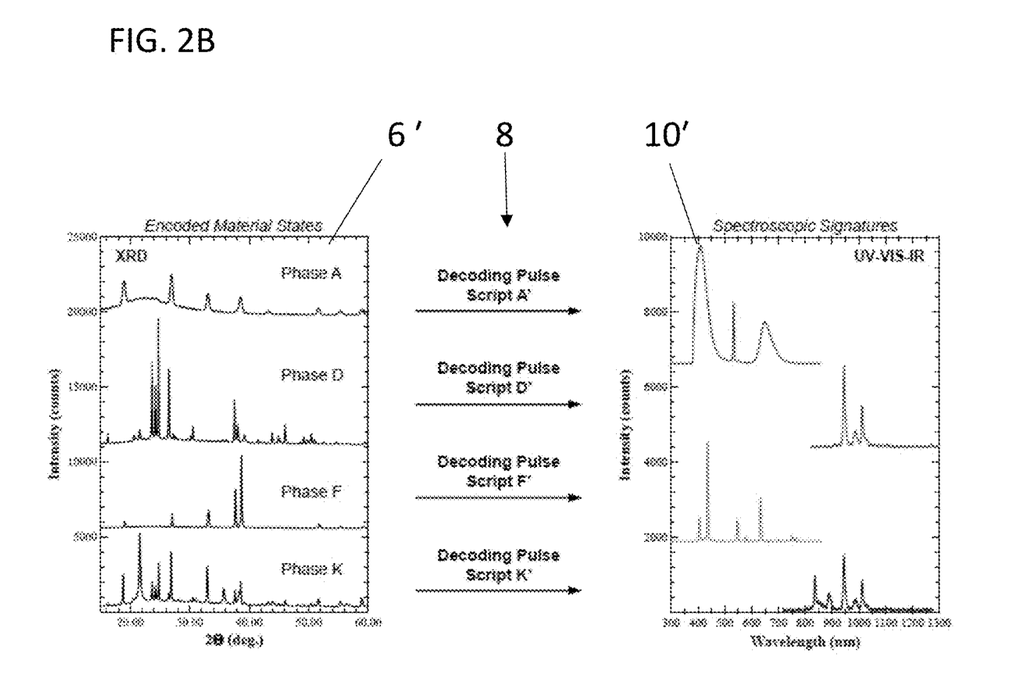
FIG. 2B displays the emission spectra measured for selected laser-encoded regions of the material substrate in FIG. 2A, in accordance with some embodiments of the present disclosure.

X-ray diffraction (XRD) spectroscopy was used to study the formation and identity of the crystalline phases in the glass-ceramic substrates following laser-scripted exposure in FIG. 2A. The XRD data revealed the existence of numerous and distinct silicate phases, including pure lithium metasilicate, pure lithium disilicate, and mixed-phase meta-disilicates. Representative XRD results for four of the sixteen sections of the modified substrate (6) are shown in FIG. 2B (left). The Phase A diffraction pattern corresponds to an amorphous glass and lithium metasilicate mixture; the Phase D diffraction pattern corresponds to lithium disilicate; the Phase F diffraction pattern corresponds to lithium metasilicate; and the Phase K diffraction pattern corresponds to a mixed-phase lithium metasilicate disilicate. This example highlights the ability to encode materials with discrete and pre-defined phases, compositions, and densities.

For the optical decoding, UV-VIS-IR spectroscopy was used to measure the photoemission patterns and spectral responses for the array of complex silicate phases that were created in the glass substrates via laser-scripted encoding. Each laser-patterned region, comprising the variegated lithium meta-disilicate fractions, was irradiated with prescribed proprietary laser decoding pulse scripts. FIG. 2B (right) displays the emission spectra measured for the four laser-encoded regions (Phase A, Phase D, Phase F, Phase K). The disparate emission spectra shown in FIG. 2B are related to the structural characteristics of the respective lithium metasilicate, lithium disilicate, and mixed phase lithium metasilicate-disilicate phases that were imprinted into the glass via the encoding pulse scripts. Hundreds of decoding pulse scripts for Foturan have been prepared in this manner, providing an encoding and decoding digest of pulse scripts for that material substrate.

The emission features and data in FIG. 2B demonstrates that discrete decoding laser pulse scripts, linked reciprocally and exclusively to their encoding laser pulse script counterparts, can be used to illicit unique spectral fingerprints from the programmed material substrates. Through analysis of the photoemission patterns, a materials response can be compared to the expected signature for authentication and translated for data retrieval. The phase dispositions and emission patterns are reciprocally and singularly linked via the encoding-decoding pulse scripts, which provides the capability for secure multi-factor authentication and resistance to ID replication and reverse engineering.

Several types of phase-encrypted prototype structures have been fabricated according the above method. The various structures span size domains from the nanoscale to the macroscale, and include imprinted nano-phase inclusions, micro-pixel arrays, macro-scale patterns, and embedded and stacked tags.

Figure 3A:
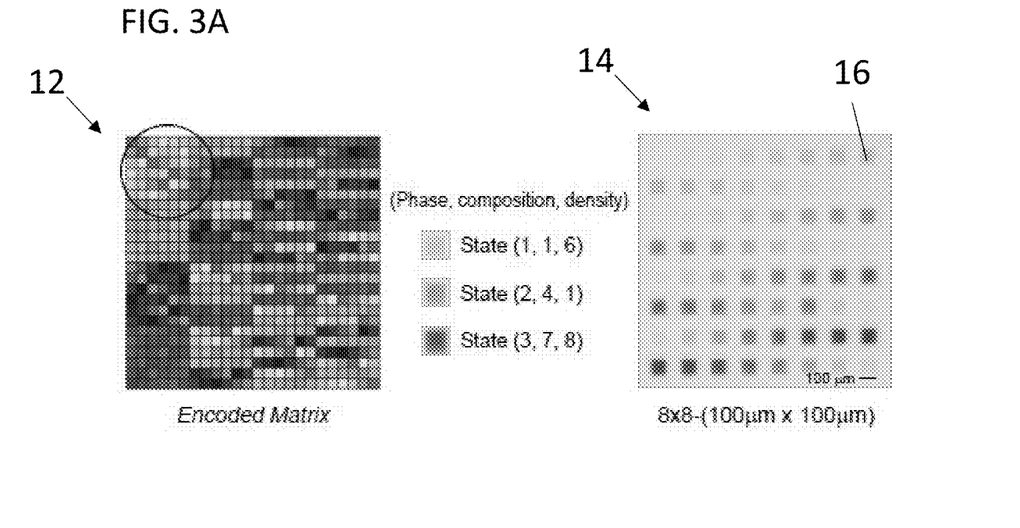
FIG. 3A depicts a top view of a micro-pixel array for a material substrate after treatment with a laser encrypting script, in accordance with some embodiments of the present disclosure.
Figure 3B:
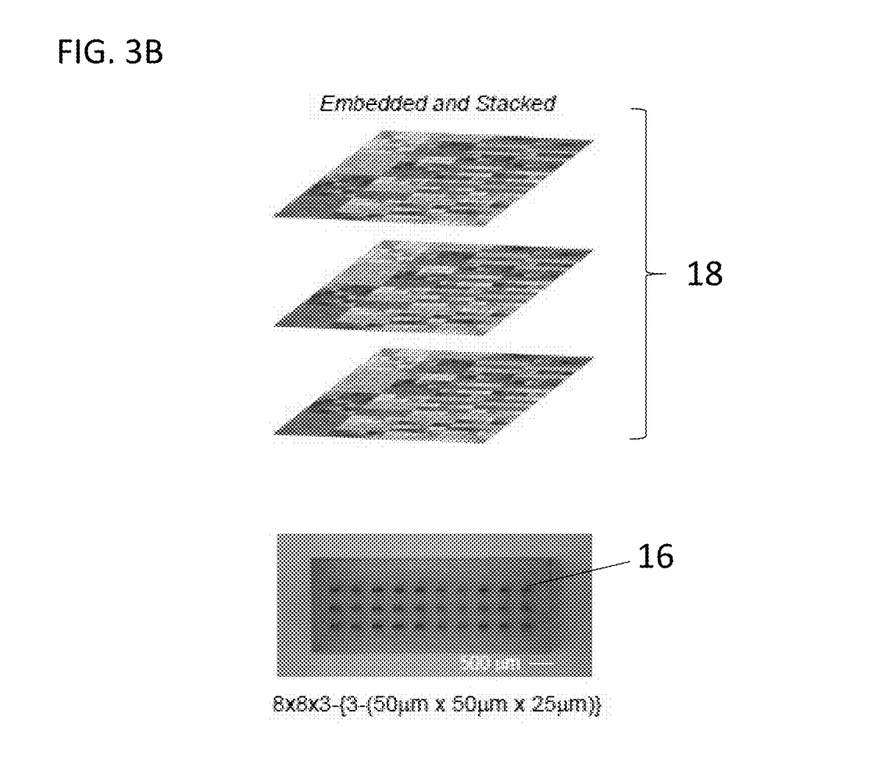
FIG. 3B depicts an exploded perspective view of an embedded and stacked tag of micro-pixel arrays for a material substrate after treatment with a laser encrypting script, and a side view of the material substrate showing the discretely stacked and embedded tag layers, in accordance with some embodiments of the present disclosure.
Figure 3C:
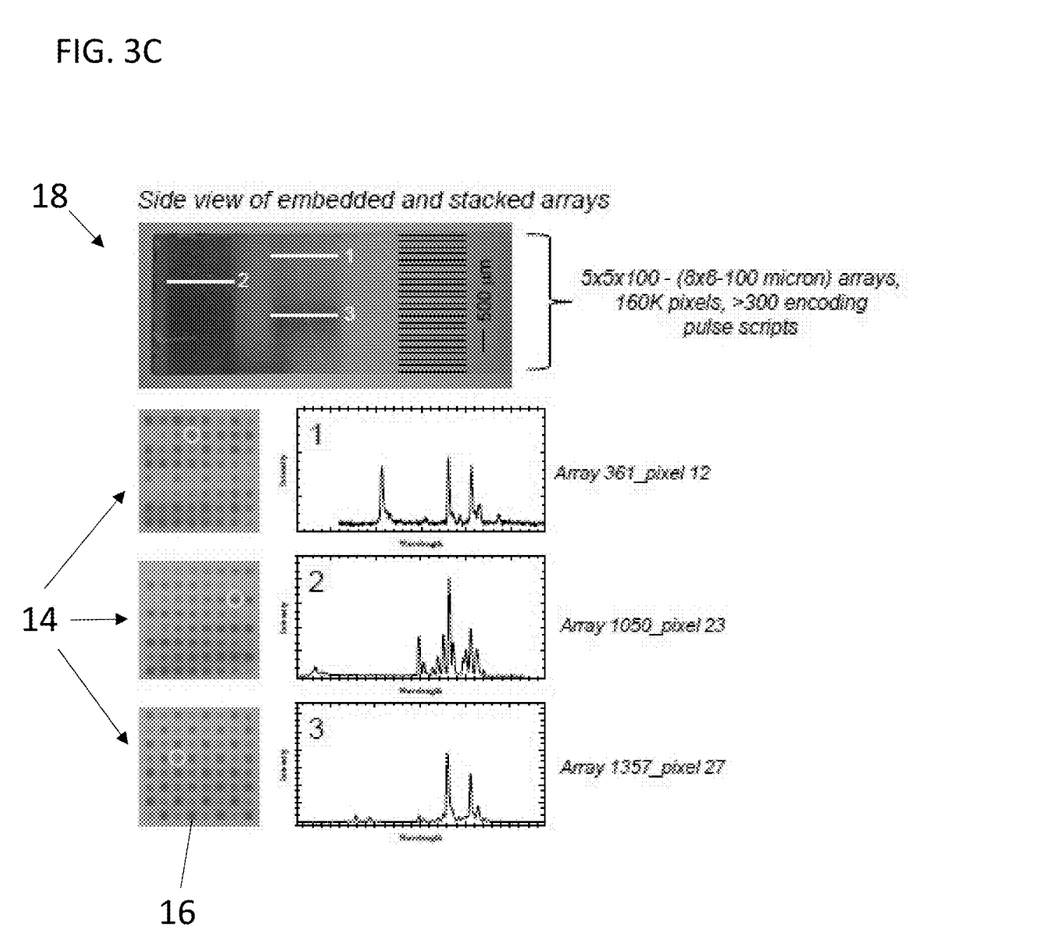
FIG. 3C depicts a side view of another embedded and stacked tag of micro-pixel arrays, having a different pixel size and density compared with FIG. 3B, after treatment with a laser encrypting script, and the corresponding emission spectra for the selected material substrate pixel locations, in accordance with some embodiments of the present disclosure.

FIGS. 3A, 3B, and 3C show three structures that were fabricated out of Foturan glass ceramic: a micro-pixel array (FIG. 3A) and two types of embedded and stacked tags (FIGS. 3B, 3C). The micro-pixel structure (12) in FIG. 3A corresponds to an 8×8 array of pixels (14), where each individual pixel (16) is 100 μm×100 μm and comprises a discrete phase-encoded volume element ("voxel"). Sixty-four distinct encoding pulse scripts were administered to create the array of pixels (14). The array can be expanded spatially and tailored pixel-by-pixel in phase, composition, and density, thereby extending the encoded matrix into multiple dimensions: 3-D, 4-D, 5-D, etc.

In FIG. 3B, the embedded and stacked structure (18) comprises an 8×8×3 encoded matrix that was fabricated in a 2-mm thick Foturan glass substrate. The side-view shows three 8×8 arrays stacked and separated by several hundred micrometers. Each voxel contains three individual pixels (50 μm×50 μm×25 μm), yielding nearly six hundred phase-encoded entities. The size, dimension, and spatial repetition can be specially designed to create encoded architectures that range from simple to highly complex, depending on the data encryption requirements of the target application.

FIG. 3C shows a side view of another embedded and stacked structure (18) comprising one hundred discrete layers, in which each layer corresponds to a 5×5 array of 8×8 sub-arrays. Each of the 8×8 sub-arrays contain 64 pixels (16), having a dimension of 100 μm×100 μm×25 μm. FIG. 3C also shows three specific 8×8 sub-arrays (14) located at different depths within the glass substrate along with the corresponding emission spectra for the circled material substrate pixel locations. These stacked structures illustrate high-density encoding capability and are useful for high-capacity 3-D information comprising payloads over 1 TB/mm$^3$.

Figure 4A:
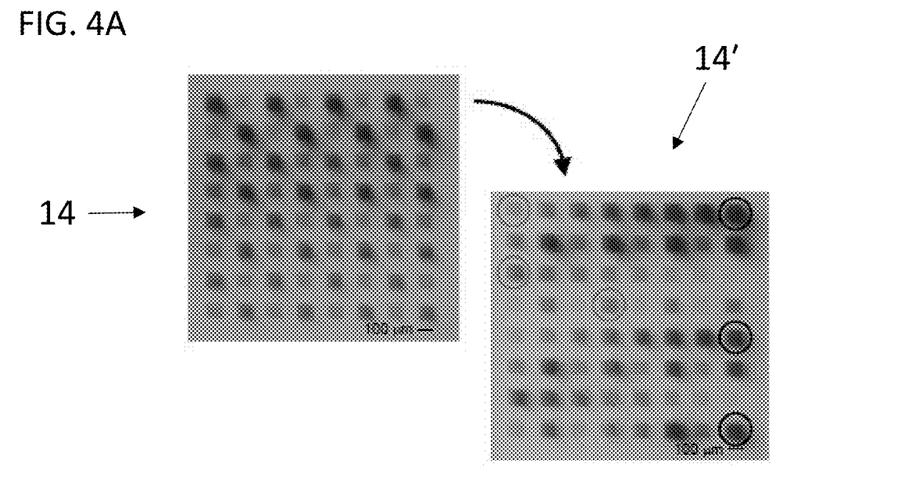
FIG. 4A depicts a top view of a material substrate after treatment with a laser encrypting script and the same material substrate after a subsequent treatment with a laser encrypting script, in accordance with some embodiments of the present disclosure.
Figure 4B:
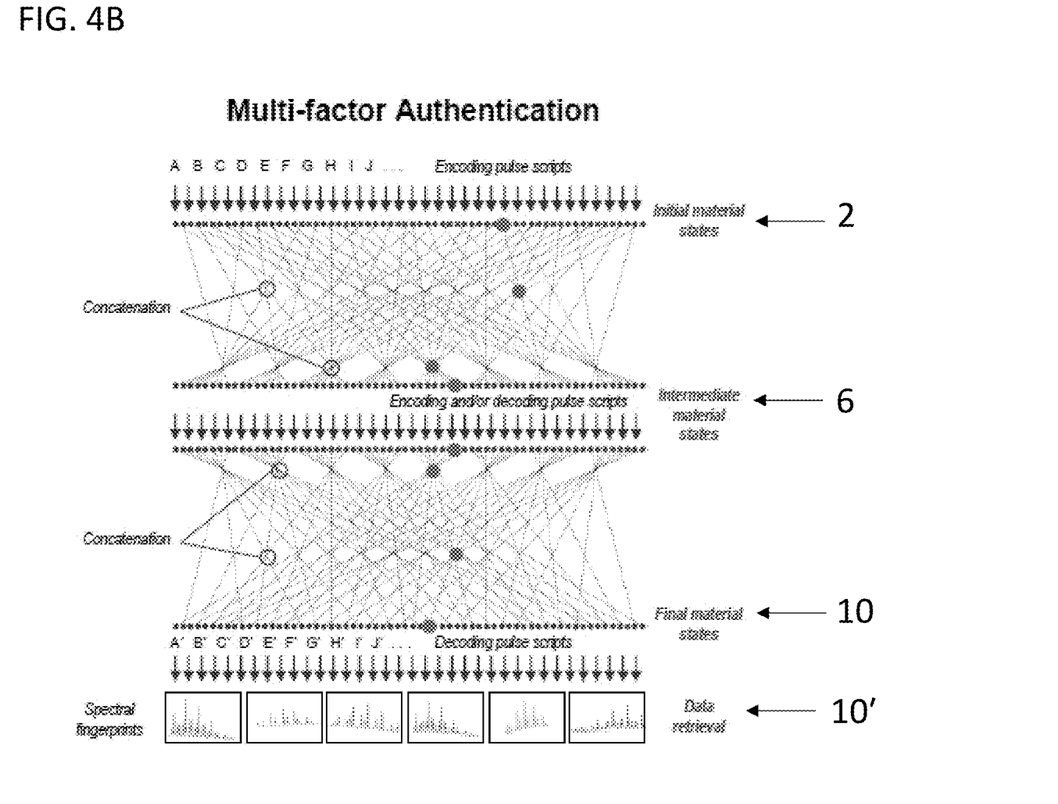
FIG. 4B is a diagram demonstrating a sequential encoding-decoding process of a material substrate and the emission spectra for selected laser-encoded regions of the encrypted material substrate, in accordance with some embodiments of the present disclosure.

FIGS. 4A and 4B demonstrate a sequential encoding-decoding application. In this example, FIG. 4A shows the evolutionary nature of the encoding-decoding process, whereby the material state encoded on the array of pixels (14) is converted to a secondary material state encoded or decoded on the array of pixels (14'). FIG. 4B illustrates how a material substrate (2) is encrypted with multi-factor authentication. The material substrate (2) is encoded with encrypting pulse scripts to obtain an intermediate modified material substrate (6), which is then treated with a predefined sequence of deciphering pulse scripts to obtain a final remodified material substrate (10). In a data retrieval step, the spectral fingerprints (10') are acquired for authentication of the material substrate.

Figure 5:
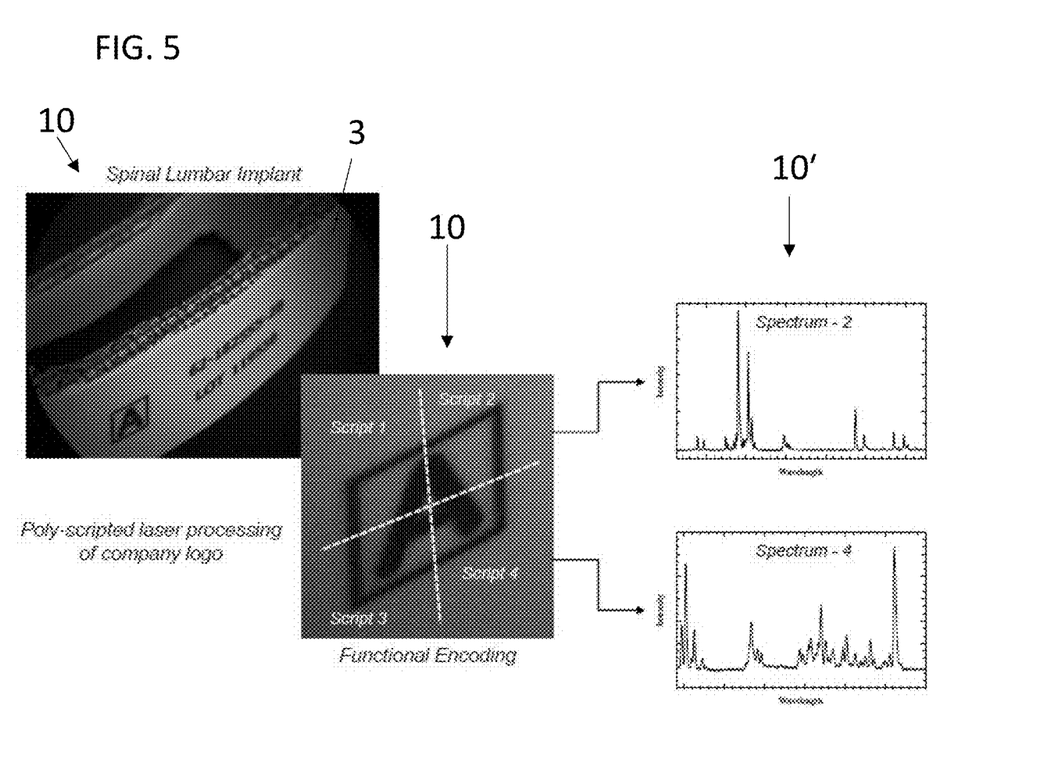
FIG. 5 depicts a material substrate that was treated with a plurality of laser encrypting pulse scripts and spectra corresponding to the surface chemistry at the location of the laser scripts, in accordance with some embodiments of the present disclosure.

FIG. 5 depicts another example of encoding and decoding information on a material substrate. In FIG. 5, the remodified material substrate (10) is a spinal lumbar implant having an exposed surface (3) that was treated with a plurality of laser encrypting pulse scripts at the location of the company logo [A]. The partial thumbnail image shown in the middle of FIG. 5 illustrates how the material substrate (2) was treated. Specifically, the exposed surface (3) was treated at that location with four scripts (Script 1, Script 2, Script 3, Script 4). Each script was configured to exhibit a unique spectral fingerprint (10'). For example, the spectra shown on the right side of FIG. 5 are the UV-VIS-IR spectroscopic signatures for Script 2 and Script 4. It is evident from the different peaks in the spectra that the surface chemistry where Script 2 was encoded was manipulated differently than the surface chemistry where Script 4 was encoded. This example demonstrates the ability to encode regulated medical devices and to monitor those products as they proceed through a supply chain, and therefore ensure that a patient does not receive a potentially harmful or defective counterfeit spinal lumbar implant.

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of encoding information on a material substrate, said method comprising:
   providing a material substrate comprising at least one exposed surface or interior location having an initial material state;
   treating the exposed surface or interior location with an energy source, wherein the energy source encodes encryption information on the exposed surface or interior location to provide a modified material substrate comprising an exposed surface with an intermediate material state; and
   treating the exposed surface or interior location with an intermediate material state with the energy source to encode decipher information on the exposed surface or interior location to provide a remodified material substrate comprising an exposed surface or interior location with a final material state.

2. The method of claim 1, wherein the energy source is a laser, the encryption information comprises a laser encrypting pulse script, and the decipher information comprises a laser deciphering pulse script.

3. The method of claim 2, wherein the initial material state, intermediate material state, and final material state have distinct surface or bulk chemistries relative to each other based on their phase state, composition, density, transduction, induction, or any combination thereof.

4. The method of claim 3, wherein the initial material state is based on the inherent properties of the material substrate, and the intermediate state is based on a combination of the inherent properties of the material substrate and the laser encrypting pulse script.

5. The method of claim 3, wherein the intermediate material state of the material substrate is configured to exhibit a photoemission pattern or spectroscopic signature that is distinct from a photoemission pattern or spectroscopic signature exhibited by the material substrate in the initial material state.

6. The method of claim 2, wherein the laser parameter specifications comprise wavelengths ranging from 355 to 500 nm, pulse durations ranging from several hundred femtoseconds (fs) to a few nanoseconds (ns), pulse repetition rates ranging from several kHz to one hundred MHz, or any combination thereof.

7. The method of claim 2, wherein the laser encrypting pulse script or laser deciphering pulse script comprises a pulse number ranging from 1 to 300,000, a pulse intensity ranging from 0.01 to 1000 mJ/cm$^2$, an inter-pulse delay ranging from 10 ns to 1 ms, or any combination thereof.

8. The method of claim 1, wherein the final material state is configured to exhibit a photoemission pattern or spectroscopic signature that is distinct from a photoemission pattern or spectroscopic signature exhibited by the material substrate in the initial material state or the intermediate state.

9. The method of claim 1, wherein the exposed surface or interior location of the material substrate is treated with a laser encryption pulse script to obtain a modified material substrate encoded with a disposition distinct from that of the material substrate; and the exposed surface or interior location of the modified material substrate is treated with a laser decryption pulse script to obtain a remodified material substrate encoded with a disposition distinct from that of the material substrate and the modified material substrate.

10. The method of claim 1, wherein the information encoded is configured for authentication and tracking, anti-counterfeiting, and secure information transfer and data security.

11. The method of claim 1, wherein the material substrate is integrated or embedded within a component.

12. The method of claim 1, further comprising decoding the information on the exposed surface or interior location with a final material state.

13. The method of claim 12, wherein the decoding comprises measuring the photoemission patterns or spectral responses elicited from the exposed surface or interior location with a final material state.

14. A device comprising encoded information, comprising:
a modified material substrate comprising at least one modified surface or interior location, the at least one modified surface or interior location comprising a final material state defined by surface or bulk chemistry that is distinguishable from an initial material defined by surface or bulk chemistry of an unmodified surface of the device,
wherein the surface or bulk chemistry is defined by phase state, composition, density, transductions, inductions, or any combination thereof; and
wherein the final material state of the at least one modified material surface or interior location was obtained by treating at least one surface or interior location of a material substrate with a plurality of pulsed light beams.

15. The device of claim 14, wherein the at least one modified surface or interior location was modified using a discrete laser encrypting pulse script, a discrete laser deciphering pulse script, or a combination thereof.

16. The device of claim 15, wherein the discrete laser encrypting pulse script or discrete laser deciphering pulse script comprises a characteristic wavelength (frequency), amplitude, pulse duration, pulse repetition rate, polarization, or any combination thereof.

17. The device of claim 15, wherein the final material state of the at least one modified material surface or interior location comprises encoded information that is configured for authentication and tracking, anti-counterfeiting, or secure information transfer and data security.

18. The device of claim 15, wherein the laser encrypting pulse script or laser deciphering pulse script comprises a pulse number ranging from 1 to 300,000, a pulse intensity ranging from 0.01 to 1000 mJ/cm$^2$, an inter-pulse delay ranging from 10 ns to 1 ms, or any combination thereof.

19. The device of claim 14, wherein the final material state of the at least one modified surface or interior location of the modified material substrate is configured to exhibit a photoemission pattern or spectroscopic signature that is distinct from a photoemission pattern or spectroscopic signature exhibited by the initial material state of an unmodified surface or interior location of the device.

20. The device of claim 14, wherein the device is integrated or embedded within a component.

* * * * *